US009978393B1

(12) United States Patent
Nokes

(10) Patent No.: US 9,978,393 B1
(45) Date of Patent: May 22, 2018

(54) SYSTEM AND METHOD FOR AUTOMATICALLY REMOVING NOISE DEFECTS FROM SOUND RECORDINGS

(71) Applicant: Rob Nokes, Marina Del Rey, CA (US)

(72) Inventor: Rob Nokes, Marina Del Rey, CA (US)

(*) Notice: Subject to any disclaimer, the term of this patent is extended or adjusted under 35 U.S.C. 154(b) by 0 days. days.

(21) Appl. No.: 15/701,445

(22) Filed: Sep. 12, 2017

(51) Int. Cl.
*H04B 15/00* (2006.01)
*G10L 21/0264* (2013.01)
*H04R 1/10* (2006.01)

(52) U.S. Cl.
CPC ........ *G10L 21/0264* (2013.01); *H04R 1/1083* (2013.01)

(58) Field of Classification Search
CPC .......................... G10L 21/0264; H04R 1/1083
USPC ......................................................... 381/94.1
See application file for complete search history.

(56) References Cited

U.S. PATENT DOCUMENTS

2018/0033448 A1* 2/2018 Matsuo ............... G10L 21/0264

* cited by examiner

*Primary Examiner* — Paul S Kim
(74) *Attorney, Agent, or Firm* — James M. Smedley LLC; James Michael Smedley, Esq.

(57) ABSTRACT

Embodiment apparatus and associated methods relate to automatically improving the quality of a segmented audio stream containing a desired signal, based on filtering an audio segment with an audio filter configured to remove a predetermined noise, and adapting the audio filter degree of noise removal determined as a function of a characteristic of the desired signal in the audio segment. In an illustrative example, the desired signal may be human voice. The predetermined noise may be, for example, wireless ring, hum, or tick resulting from a wireless microphone. In various implementations, the desired signal characteristic may be voice activity detected in the audio segment, and the audio filter degree of noise removal may be adapted as a function of the voice activity. Various examples may advantageously provide faster and more accurate vocal dialog editing in sound production procedures such as ADR (known as Alternative Dialog Replacement, or, Additional Dialog Recording).

19 Claims, 9 Drawing Sheets

SYSTEM AND METHOD FOR AUTOMATICALLY REMOVING NOISE DEFECTS FROM SOUND RECORDINGS

FIELD OF THE INVENTION

The detection and removal of noise defects from sound recordings.

BACKGROUND

Sound is captured by microphones and stored in computer sound files which may be manipulated and altered by software algorithms for the purposes of removing noise defects, such as but not limited to hums, buzzes, pops, clicks, snaps, hisses, wireless ringing, traffic, and engines. The human brain has a subconscious ability to automatically remove these noise defects from consciously being heard, however in sound recordings these noise defects become much more apparent and must be removed through the use of software.

Depending on the environment and equipment used, microphones simultaneously capture desired sounds and undesired noise. For example, a wireless microphone worn by an actor on a production set may also capture noise defects from various electromagnetic or environmental sources, on or off the production set. A common example is a power generator or air conditioner humming in the distance. Noises in a sound recording are detrimental to the presentation of an actor's performance and may distract the viewer from the story. An example of this would be hearing a power generator or air conditioner on a deserted island.

Most actors, producers, and directors prefer original performances, and ask professionals to use manual sound processing software to repair the actor's original sound recordings. In the event the noise defects cannot be removed, the actor will have to re-perform their dialog in a studio and duplicate the emotions and feelings of their original performance. This is generally considered difficult, costly, time consuming, and is usually inferior to the original performance.

The manual removal of noise from sound recordings requires years of practice and experience in order to achieve results that are acceptable to professionals. Manual removal of noise also requires extraordinarily repetitive and time consuming manual tasks that are better suited to automation.

Accordingly, it is an aspect of the present invention to provide a system and method for automatically detecting and removing noise defects from sound recordings while preserving the human voice or other desired sounds in the sound recordings. This invention automatically and accurately removes obvious noise defects and mitigates manual repetitive labor.

SUMMARY OF THE INVENTION

Embodiment apparatus and associated methods relate to automatically improving the quality of a segmented audio stream containing a desired signal. The segmented audio stream may be improved by filtering the audio segment with an audio filter, configured to remove a predetermined noise, and adapting the audio filter degree of noise removal determined as a function of a characteristic of the desired signal in the audio segment. In an illustrative example, the desired signal may be human voice. The predetermined noise may be, for example, wireless ring, hum, or tick resulting from a wireless microphone. In various implementations, the desired signal characteristic may be voice activity detected in the audio segment, and the audio filter degree of noise removal may be adapted as a function of the voice activity. Various examples may advantageously provide faster and more accurate vocal dialog editing in sound production procedures such as ADR (known as Alternative Dialog Replacement, or, Additional Dialog Recording).

Various embodiments may achieve one or more advantages. For example, some embodiments may reduce the post-production effort required to improve the quality of sound recorded on a production set. This facilitation may be a result of automatically adapting an audio filter degree of noise removal as a function of a characteristic of recorded voice. In some embodiments, faster audio post-production quality improvement may be achieved by automatically filtering an audio track containing voiced dialog to remove wireless ring, hum, or tick resulting from a wireless microphone. In an illustrative example, the audio filter may be configured to remove the wireless ring, hum, or tick, with the filter degree of noise removal adapted based on voice activity detection. Such automatic audio filter degree of noise removal adapted as a function of voice activity may increase the usability of filtered vocal dialog based on allowing more voice and retaining less noise. Some embodiments may reduce post-production costs associated with improving the quality of sound recorded on a production set. Such cost reduction may be a result of the reduced time allocation of expensive actors or experienced sound engineers.

In some embodiments, the accuracy of noise removal in procedures such as ADR may be improved. For example, a sound engineer performing manual editing may avoid timing errors associated with variable human response time. This facilitation may be a result of automatically adapting an audio filter to remove more noise when voice is not active, and adapting the audio filter to allow more voice when voice is active. Various examples may advantageously improve a live vocal dialog recording's quality to be releasable at higher production values. Such facilitation may be a result of automatically allowing voice and filtering noise based on characteristics of the voice and noise, and improving the audio from the original production set take, rather than dubbing a replacement in post-production.

According to an embodiment of the present invention, a method to automatically remove a predetermined noise signal from a segmented audio stream containing a desired audio signal, comprises the steps of: adapting an audio processing system to detect activity of the desired audio signal; comparing at least two segments of the audio stream as a function of the predetermined noise signal and the desired audio signal, to determine a baseline degree of noise removal based on the comparison; configuring an audio filter to remove the baseline degree of the predetermined noise signal; and, automatically improving the quality of the segmented audio stream based on filtering at least one segment of the audio stream with the audio filter, and adapting the audio filter degree of noise removal as a function of the activity of the desired audio signal and the baseline degree of noise removal.

According to an embodiment of the present invention, the desired audio signal further comprises a human voice.

According to an embodiment of the present invention the method further comprises providing a user interface adapted to receive user input, and the noise signal is predetermined based on spectral analysis of a segment of the audio stream selected by a user.

According to an embodiment of the present invention, the predetermined noise signal is a wireless ring, hum, or tick.

According to an embodiment of the present invention, each segment of the audio stream represents at least ten milliseconds and not more than thirty milliseconds of real-time audio.

According to an embodiment of the present invention, adapting the audio filter degree of noise removal further comprises: determining a maximum degree of noise removal as a function of the energy level of the desired audio signal; configuring the degree of noise removal to the determined maximum upon a determination the desired audio signal is not active, and, restoring the degree of noise removal to the baseline degree of noise removal upon a determination the desired audio signal is active.

According to an embodiment of the present invention, adapting the audio filter degree of noise removal further comprises: determining a minimum degree of noise removal as a function of the energy level of the desired audio signal; configuring the degree of noise removal to the determined minimum upon a determination the desired audio signal is active, and, restoring the degree of noise removal to the baseline degree of noise removal upon a determination the desired audio signal is not active.

According to an embodiment of the present invention, the audio filter is configured as a function of spectral analysis of at least one of: the noise signal and the desired signal.

According to an embodiment of the present invention, a method to automatically remove a predetermined noise signal from a segmented audio stream containing a desired audio signal, comprises the steps of: adapting an audio processing system to determine at least one characteristic of the desired audio signal, determined as a function of at least one segment of the audio stream; configuring an audio filter to remove the predetermined noise signal; and, automatically improving the quality of the segmented audio stream based on filtering at least one segment of the audio stream with the audio filter, and adapting the audio filter degree of noise removal as a function of the at least one characteristic of the desired audio signal.

According to an embodiment of the present invention, the at least one characteristic of the desired audio signal further comprises activity detection.

According to an embodiment of the present invention, the at least one characteristic of the desired audio signal further comprises energy level.

According to an embodiment of the present invention, the desired audio signal further comprises a human voice.

According to an embodiment of the present invention, filtering at least one segment of the audio stream with the audio filter further comprises removing the at least one segment.

According to an embodiment of the present invention, filtering at least one segment of the audio stream with the audio filter further comprises configuring the audio filter to remove at least one harmonic residual from a previous filtering step.

According to an embodiment of the present invention, configuring the audio filter further comprises determining the fundamental frequency of background noise measured when the desired audio signal is not active, and configuring the audio filter to remove one or more harmonic of the background noise.

According to an embodiment of the present invention, the predetermined noise signal further comprises a wireless signal.

According to an embodiment of the present invention, a system to automatically remove a predetermined noise from a segmented audio stream containing a desired audio signal, comprises: an audio processing system adapted to determine at least one characteristic of a received segmented audio stream and emit segments of the audio stream comprising filtered audio; a processor, operably coupled to the audio processing system; and, a memory that is not a transitory propagating signal, the memory connected to the processor and encoding computer readable instructions, including processor executable program instructions, the computer readable instructions accessible to the processor, wherein the processor executable program instructions, when executed by the processor, cause the processor to perform operations comprising: receiving, from the audio processing system, a series of audio stream segments; configuring the audio processing system to detect activity of the desired audio signal; comparing at least two segments of the audio stream as a function of the predetermined noise signal and the desired audio signal, to determine a baseline degree of noise removal based on the comparison; configuring an audio filter to remove the baseline degree of the predetermined noise signal; configuring the audio processing system to determine at least one characteristic of the desired audio signal, determined as a function of at least one segment of the audio stream; and, automatically improving the quality of the segmented audio stream based on filtering at least one segment of the audio stream in the audio processing system with the audio filter, and adapting the audio filter degree of noise removal as a function of the at least one characteristic of the desired audio signal.

According to an embodiment of the present invention, the audio filter further comprises reverse gate means operable to remove less noise when the gate is open, and operable to remove more noise when the gate is closed; and, adapting the audio filter degree of noise removal further comprises opening the reverse gate when the desired audio signal is active, and closing the reverse gate when the desired audio signal is not active.

According to an embodiment of the present invention, the desired audio signal further comprises a human voice.

The details of various embodiments are set forth in the accompanying drawings and the description below. Other features and advantages will be apparent from the description and drawings, and from the claims.

BRIEF DESCRIPTION OF THE DRAWINGS

Like reference symbols in the various drawings indicate like elements.

DETAILED DESCRIPTION OF ILLUSTRATIVE EMBODIMENTS

To aid understanding, this document is organized as follows. First, automatically improving the quality of a segmented audio stream containing a desired signal, based on filtering an audio segment with an audio filter configured to remove a predetermined noise, and adapting the audio filter degree of noise removal determined as a function of a characteristic of the desired signal in the audio segment is briefly illustrated with reference to FIGS. 1A and 1B. Second, with reference to FIG. 2, the discussion turns to exemplary embodiments that illustrate the structure and design of an exemplary audio processing system. Then, with reference to FIG. 3, an illustrative process flow of an exemplary ANRE (Audio Noise Removal Engine) is described. Finally, with reference to FIG. 4, an illustrative process flow of an exemplary VAD (Voice Activity Detector) is presented.

Figure 1A:
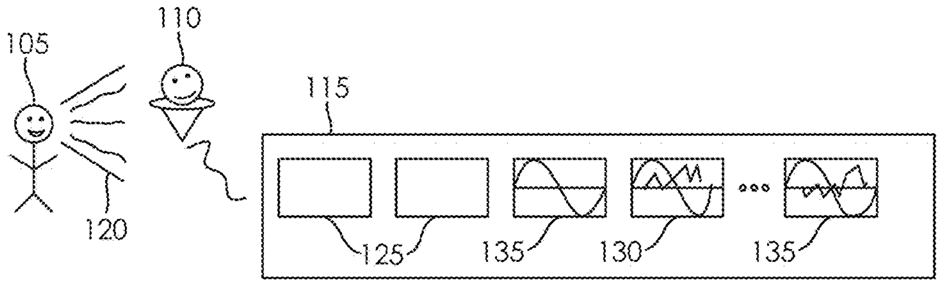
FIGS. 1A and 1B depict an exemplary audio processing system automatically improving the quality of a segmented audio stream containing a desired signal, based on filtering an audio segment with an audio filter configured to remove a predetermined noise, and adapting the audio filter degree of noise removal determined as a function of a characteristic of the desired signal in the audio segment.
Figure 1B:
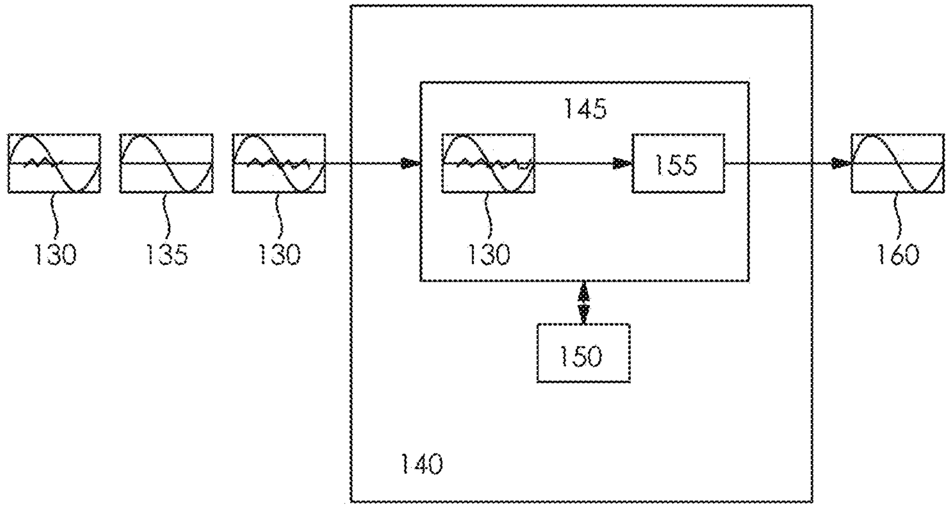

FIGS. 1A and 1B depict an exemplary audio processing system automatically improving the quality of a segmented audio stream containing a desired signal, based on filtering an audio segment with an audio filter configured to remove a predetermined noise, and adapting the audio filter degree of noise removal determined as a function of a characteristic of the desired signal in the audio segment. In FIG. 1A, a voice performer 105 uses a wireless microphone 110 wirelessly coupled to an exemplary audio recording system 115 to record sound waves 120 of voiced dialog. In the example depicted in FIG. 1A, the desired signal is due to the sound waves 120. In the example illustrated in FIG. 1A, the audio recording system receives noise due to the wireless microphone 110 in addition to the desired signal. In the example illustrated in FIG. 1A, the sound waves 120 of voiced dialog are recorded by the audio recording system as audio segments 125 without voice, audio segments 130 with noise, and audio segments 135 without noise. In an illustrative example depicted in FIG. 1B, an embodiment audio processing system 140 automatically improves the quality of the recorded audio stream including audio segments 125 without voice, audio segments 130 with noise, and audio segments 135 without noise, based on filtering an audio segment with an audio filter configured to remove a predetermined noise, and adapting the audio filter degree of noise removal determined as a function of a characteristic of the desired signal in the audio segment. In the depicted embodiment, the ANRE (Audio Noise Removal Engine) 145 detects voice activity in received audio segments based on executing VAD (Voice Activity Detector) 150 as a function of the received audio segment and the biomechanics of the human vocal tract. In an illustrative example, the ANRE 145 configures audio filter 155 to remove noise from one or more audio segments 130 with noise. In various designs, the ANRE 145 configures the audio filter 155 degree of noise removal adapted as a function of the voice activity detected by the VAD 150. In some examples, the ANRE 145 generates filtered audio output 160 with noise removed as a function of the received audio segment and the adapted audio filter 155. In an illustrative example, the filtered audio output may be a series of filtered audio output segments 160 with noise removed as a function of the received audio segment and the adapted audio filter 155.

Figure 2:
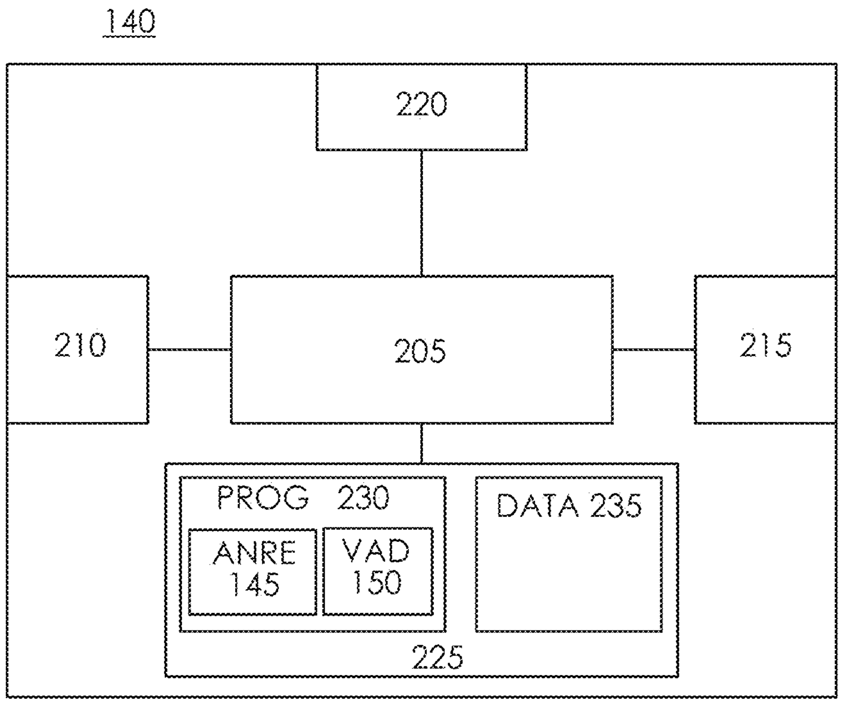
FIG. 2 depicts a structural overview of an exemplary audio processing system.

FIG. 2 depicts a structural overview of an exemplary audio processing system. In FIG. 2, a block diagram of an exemplary audio processing system 140 includes a processor 205, a wireless interface 210, a user interface 215, an audio interface 220, and a memory 225. The processor 205 is in electrical communication with the memory 225. The depicted memory 225 includes program memory 230 and data memory 235. The program memory 230 includes processor-executable program instructions implementing ANRE (Audio Noise Removal Engine) 145 and VAD (Voice Activity Detector) 150. In the depicted embodiment the processor 205 is communicatively and operably coupled with the wireless interface 210, the user interface 215, and the audio interface 220. In various implementations, the wireless interface 210 may be replaced with a wireline interface. In some designs, the wireless interface 210 may be omitted. In various implementations, the user interface 215 may be adapted to receive input from a user or send output to a user. In some embodiments, the user interface 215 may be adapted to an input-only or output-only user interface mode. In some examples, the audio interface 220 may include subsystems or modules configurable by the processor 205 to be adapted to provide audio signal input capability, audio signal output capability, audio signal sampling, spectral analysis, correlation, autocorrelation, Fourier transforms, audio sample buffering, audio filtering operations including adjusting frequency response and attenuation characteristics of time domain and frequency domain filters, signal detection, or silence detection.

Figure 3:
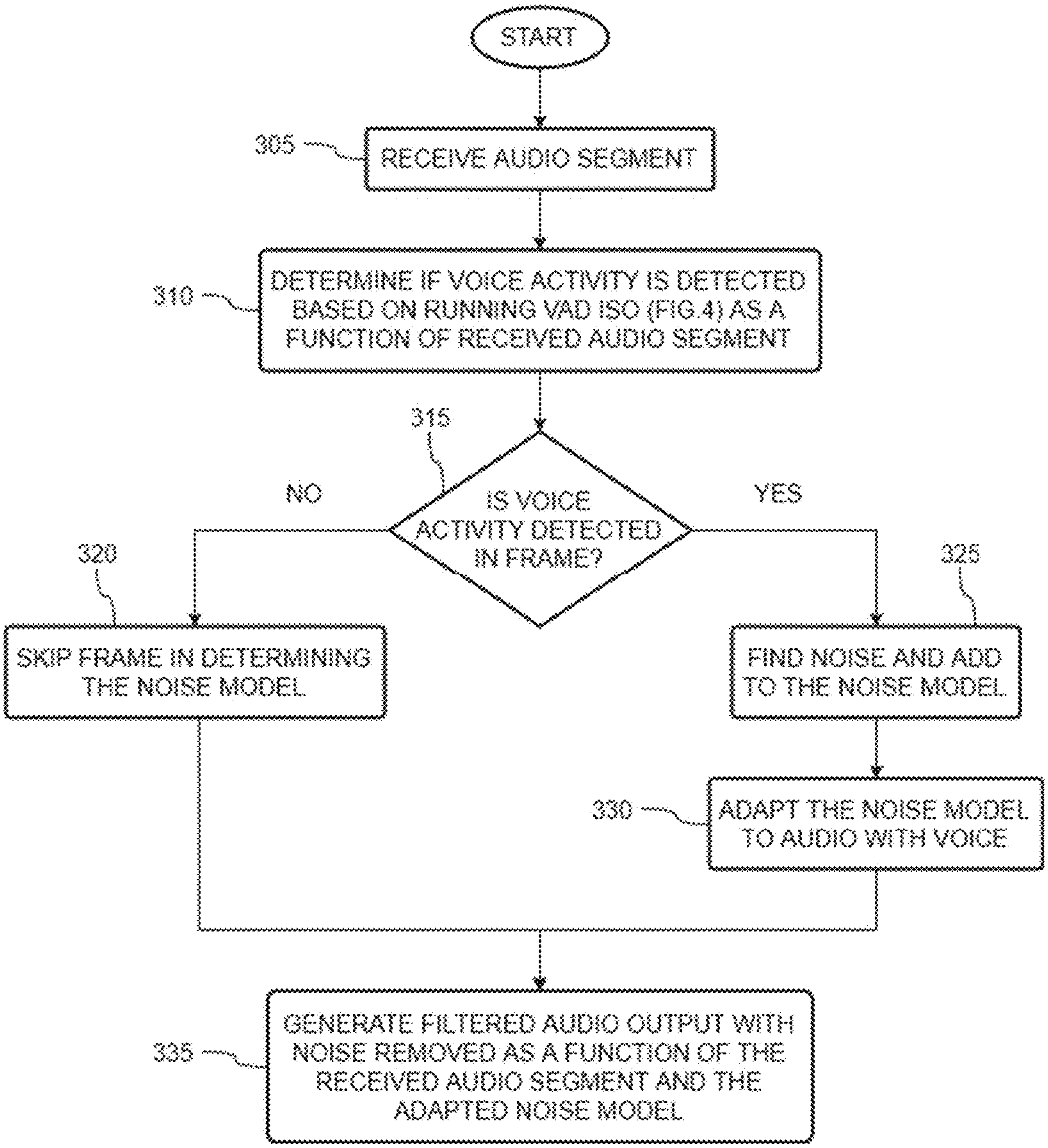
FIG. 3 depicts an illustrative process flow of an exemplary ANRE (Audio Noise Removal Engine).

FIG. 3 depicts an illustrative process flow of an exemplary ANRE (Audio Noise Removal Engine). In FIG. 3, an ANRE process flow is depicted filtering an audio segment with an audio filter 155 configured to remove a predetermined noise, and adapting the audio filter 155 degree of noise removal determined as a function of a characteristic of the desired signal in the audio segment. The method depicted in FIG. 3 is from the perspective of the ANRE executing as program instructions on a processor 205 of audio processing system 140, depicted in FIG. 2. The depicted method begins at step 305 with the processor 205 receiving an audio segment. In some scenarios, the received audio segment may be an audio segment 130 or 135 with voice. In various operations, the received audio segment may be an audio segment 125 without voice. In various examples, the received audio segment may be an audio segment 130 with noise. In some examples, the received audio segment may be an audio segment 135 without noise. In an illustrative example, the processor 205 may receive and process a series of audio segments. The method continues at step 310 with the processor 205 configured to determine if voice activity is detected based on running VAD ISO, depicted in FIG. 4, as a function of the received audio segment. The method continues at step 315 with the processor 205 determining if voice activity was detected, based on running VAD 150 at step 315. Upon a determination voice activity was detected in the received audio segment, the method continues at step 325 with the processor 205 finding noise and adding to the noise model. The method then continues at step 330 with the processor 205 adapting the noise model to audio with voice. The method ends at step 335 with the processor 205 generating filtered audio output 160 with noise removed as a function of the received audio segment and the adapted noise model. In an illustrative example, the filtered audio output may be a series of filtered audio output segments 160 with noise removed as a function of the received audio segment and the adapted noise model. On a condition that voice activity was not detected in the received audio segment, the method continues at step 320 with the processor 205 skipping a frame in determining the noise model. The method again ends at step 335 with the processor 205 generating filtered audio output 160 with noise removed as a function of the received audio segment and the adapted noise model.

Figure 4:
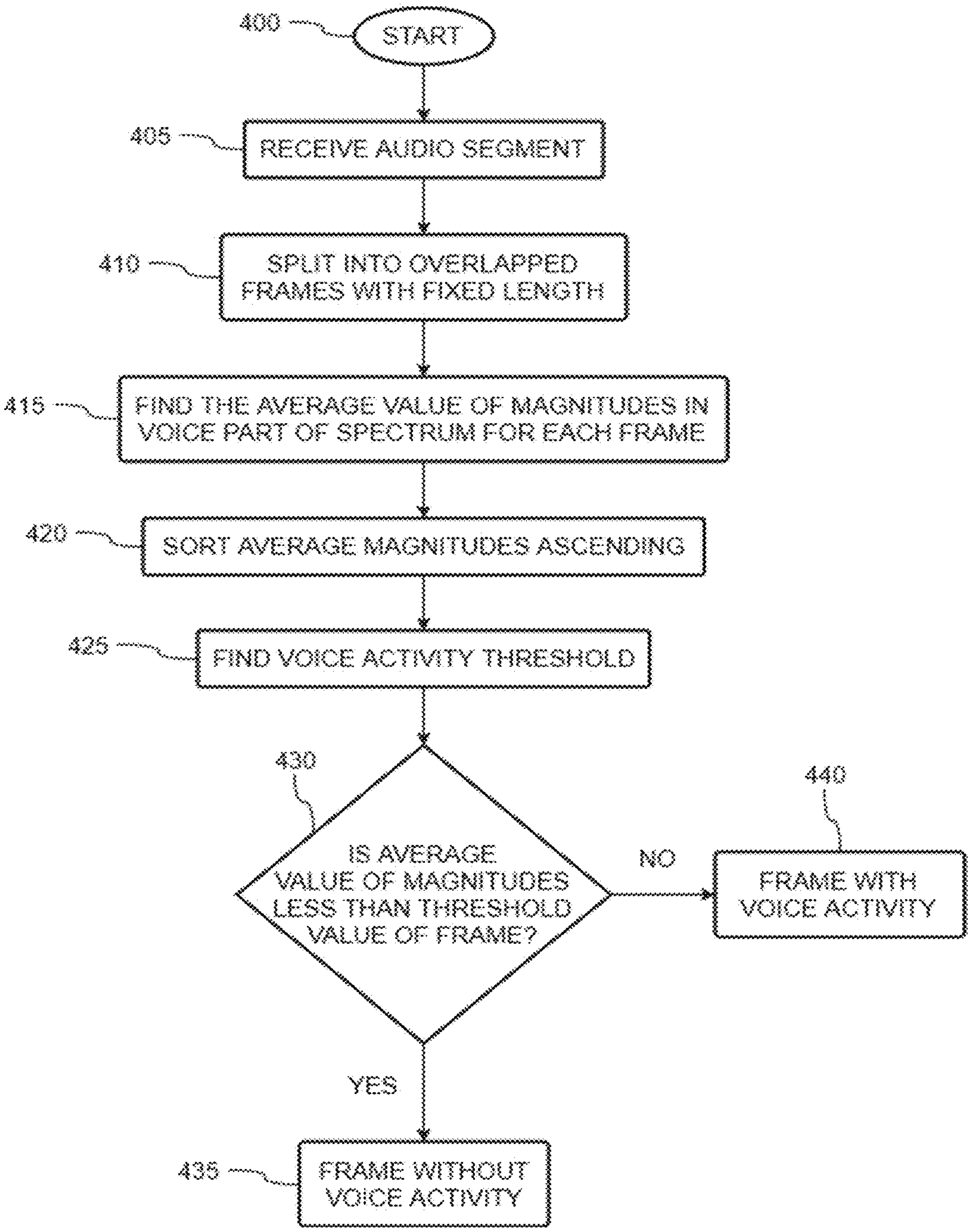
FIG. 4 depicts an illustrative process flow of an exemplary VAD (Voice Activity Detector).

FIG. 4 depicts an illustrative process flow of an exemplary VAD (Voice Activity Detector). In FIG. 4, an embodiment VAD process flow is depicted detecting voice activity in an audio segment received from an exemplary ANRE depicted in FIG. 3. The method depicted in FIG. 4 is given from the perspective of the VAD executing as program instructions on a processor 205 of the audio processing system 140, depicted in FIG. 2. The depicted method begins at step 405 with the processor 205 receiving an audio segment from an exemplary ANRE depicted in FIG. 3. In some scenarios, the received audio segment may be an audio segment 130 or 135 with voice. In various operations, the received audio segment may be an audio segment 125 without voice. In various examples, the received audio segment may be an audio segment 130 with noise. In some examples, the received audio segment may be an audio segment 135 without noise. The method continues at step 410 with the processor 205 splitting the received audio segment into overlapped frames with fixed length. The method continues at step 415 with the processor 205 finding the average value of magnitudes in the voice part of the spectrum for each frame. The method continues at step 420 with the processor 205 sorting the average magnitudes in ascending order. The method continues at step 425 with the processor 205 finding the voice activity threshold and 430 determining if the average value of magnitudes is less than the threshold value of the frame. Upon a determination, by the processor 205 at step 430, that the average value of magnitudes is less than the threshold value of the frame, the method continues at step 435 with the processor 205 generating a frame without voice activity. Upon a determination, by the processor 205 at step 430, that the average value of magnitudes is not less than the threshold value of the frame, the method continues at step 440 with the processor 205 generating a frame with voice activity.

Frames that fall between thresholds are used to create a noise model, since there is no voice activity. Or, stated differently, voice activity is above the upper threshold and is not used to create the noise model.

According to one exemplary embodiment, the processor executes a hum remover (HR) algorithm in the form of computer readable instructions residing in memory. The HR algorithm receives an audio file as input and processes the audio file in three stages: (1) voice activity detection; (2) learning; and (3) hum/noise removing. For purposes of this application, the terms "hum", "noise", and "background noise" shall be considered equivalent terms and may be used interchangeably.

Figure 5:
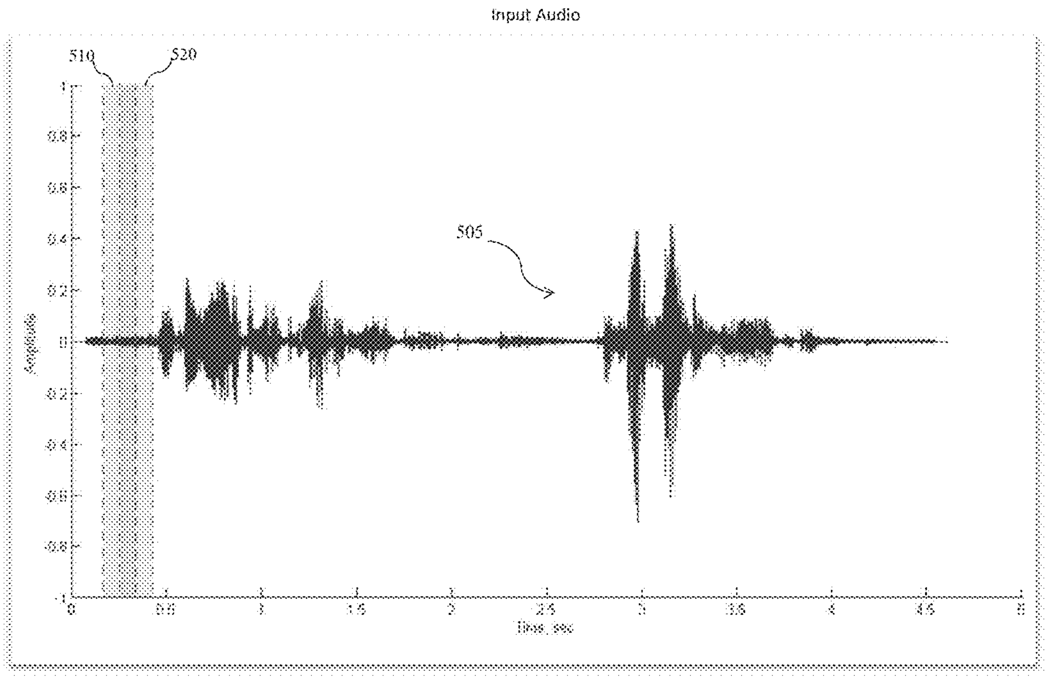
FIG. 5 is a schematic view of an exemplary waveform.

At each of the aforementioned stages the algorithm reads the file by overlapping segments of a fixed number of samples (hereinafter the frame) from beginning to end. FIG. 5 illustrates an exemplary waveform 505 analyzed by the algorithm. The boundaries of two exemplary frames 510 and 520 of the waveform 505 are marked with broken lines. After performing frame analysis from beginning of the waveform to the end, the algorithm executes the last stage by writing a cleaned up version of the waveform to a new file in which the background noise is removed.

Figure 6:
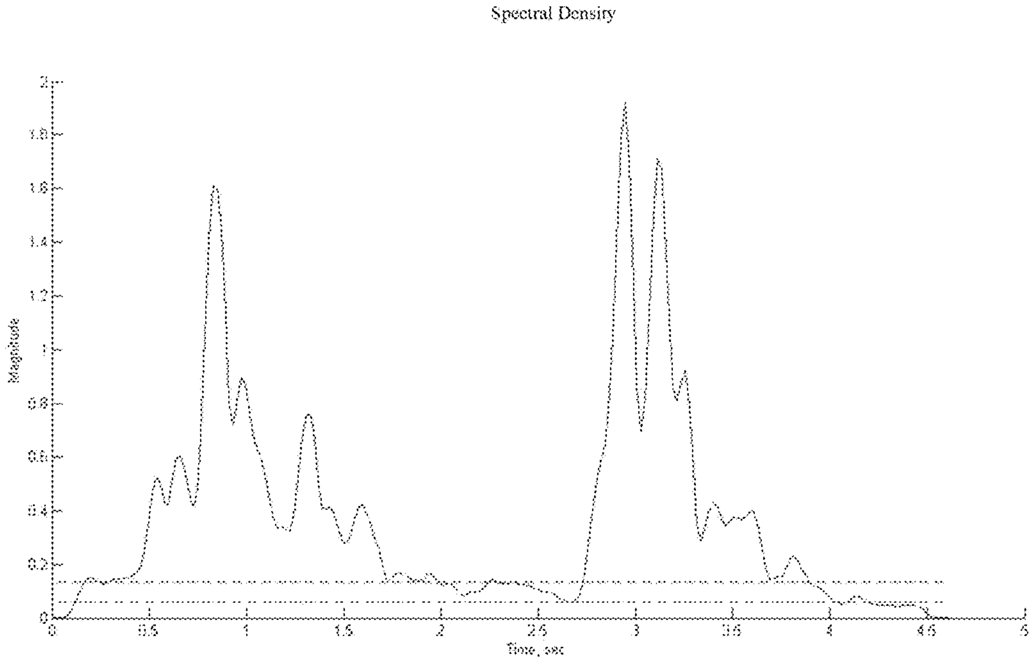
FIG. 6 is a schematic view of spectral density chart of an exemplary frame of a waveform.

At stage 1, the Voice Activity Detector (VAD) calculates the spectral density of each frame, and then sorts and normalizes the data and finds the threshold value of voice activity. The lower threshold for voice activity is found by subtracting the number of frames equivalent to the "Audio Duration for Hum Model" parameter value. FIG. 6 illustrates a spectral density graph for an exemplary frame. The terms "spectral density" and "spectrum" shall be regarded as equivalent terms throughout this application and may be used interchangeably.

Figure 7:
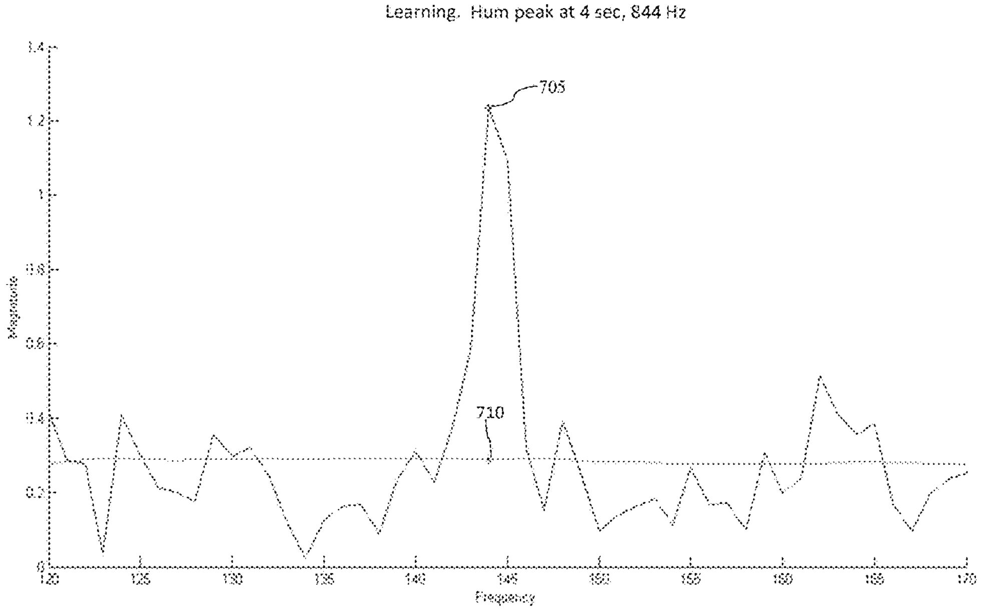
FIG. 7 depicts a schematic view showing a local peak and a local mean in a spectral density chart.

At stage 2, learning uses frames from the area found by the VAD. For each frame the algorithm computes the spectrum and detects peaks as shown in FIG. 7 for which the ratio of the peak magnitude, indicated by upper asterisk 705, to the mean value in this region, indicated by lower asterisk 710, is greater than the "Hum to Background Ratio" parameter value, which is the minimum wanted noise level relative to background noise. The characteristics of each peak are compared with the previous ones found at the same frequency, and the model is updated.

After all the frames have been processed the frequencies at which the number of peaks and magnitudes are small, i.e. not a hum, are removed from the model. If the number of frequencies with a hum in the model exceeds the value of the "Limit Hum Amount" parameter, then the algorithm leaves only the longest, in an amount equal to the value of the parameter. The Limit Hum Amount determines the amount of noise that will be found, where the least suitable noise will be removed from the model. The maximum peak magnitudes for each frequency are stored in the model, and will be used as the upper threshold for detecting peaks in all frames. The value of this threshold is increased by multiplying by the value of the "Hum Model to Real Signal Ratio" parameter, which is the gain of the found noise level, model to real signal.

Figure 8A:
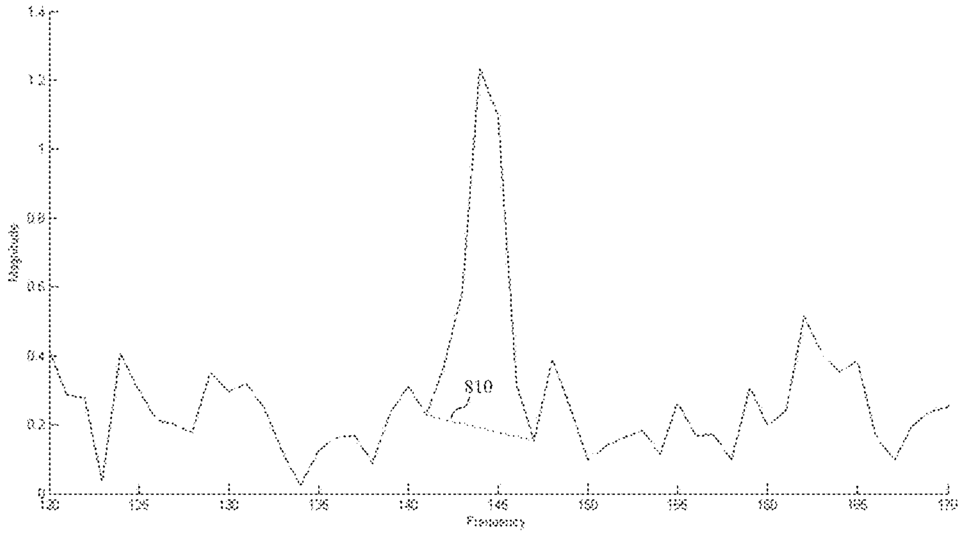
FIG. 8A is a schematic view of the spectral density chart of FIG. 7 in which a found hum peak is replaced.
Figure 8B:
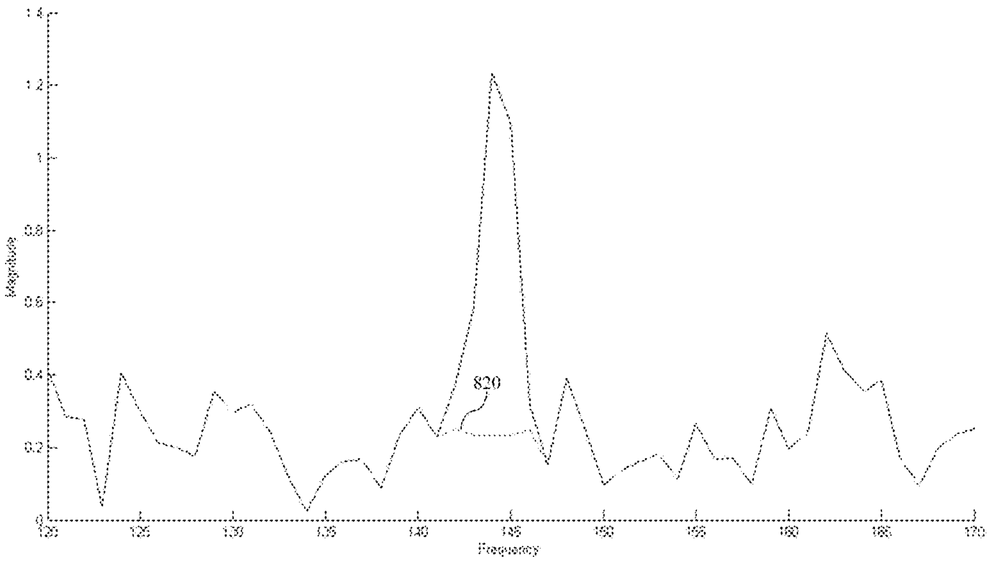
FIG. 8B is another schematic view of the spectral density chart of FIG. 7 in which a found hum peak is replaced.

For all frames the algorithm computes the spectral density and detects peaks corresponding to the model's criteria. Since not all frames are used for learning, the algorithm allows for a frequency offset, the maximum deviation is set by the "Hum Offset" parameter (−value . . . +value). Each found hum peak is replaced by the generated values represented by line 810 in FIG. 8A or exponentially smoothed line 820 in FIG. 8B. When all peaks of the hum in the frame are replaced the spectrum is converted back to the frame, which is saved to the output file.

One of ordinary skill in the art would recognize that the frames described herein do not necessarily contain voice activity. In fact, for purposes of updating the noise model a control server analyzes frames that do not contain voice activity to detect noise defects. The control server accumulates and compares these frames, finds noise and adds or updates the noise model, and then uses the model to remove noise from all frames. Since voice harmonics do not correspond to the desired noise, they are not added to the noise model and are skipped during noise removal.

A control server applying the noise detection algorithm can then differentiate noise defects and human voice dialogs, and automatically removes noise defects while avoiding the human voice dialogs. Avoidance is achieved by noise gating around the words or phrases or syllables comprising the dialogs.

Although various embodiments have been described with reference to the Figures, other embodiments are possible. For example, according to an embodiment of the present invention, the system and method are accomplished through the use of one or more computing devices. As depicted in FIG. 1 and FIG. 2, one of ordinary skill in the art would appreciate that an exemplary audio processing system 140 appropriate for use with embodiments of the present application may generally be comprised of one or more of a Central processing Unit (CPU), Random Access Memory (RAM), a storage medium (e.g., hard disk drive, solid state drive, flash memory, cloud storage), an operating system (OS), one or more application software, a display element, one or more communications means, or one or more input/output devices/means. Examples of computing devices usable with embodiments of the present invention include, but are not limited to, proprietary computing devices, personal computers, mobile computing devices, tablet PCs, mini-PCs, servers or any combination thereof. The term computing device may also describe two or more computing devices communicatively linked in a manner as to distribute and share one or more resources, such as clustered computing devices and server banks/farms. One of ordinary skill in the art would understand that any number of computing devices could be used, and embodiments of the present invention are contemplated for use with any computing device.

In various embodiments, communications means, data store(s), processor(s), or memory may interact with other components on the computing device, in order to affect the provisioning and display of various functionalities associated with the system and method detailed herein. One of ordinary skill in the art would appreciate that there are numerous configurations that could be utilized with embodiments of the present invention, and embodiments of the present invention are contemplated for use with any appropriate configuration.

According to an embodiment of the present invention, the communications means of the system may be, for instance, any means for communicating data over one or more networks or to one or more peripheral devices attached to the system. Appropriate communications means may include, but are not limited to, circuitry and control systems for providing wireless connections, wired connections, cellular connections, data port connections, Bluetooth connections, or any combination thereof. One of ordinary skill in the art would appreciate that there are numerous communications means that may be utilized with embodiments of the present invention, and embodiments of the present invention are contemplated for use with any communications means.

Throughout this disclosure and elsewhere, block diagrams and flowchart illustrations depict methods, apparatuses (i.e., systems), and computer program products. Each element of the block diagrams and flowchart illustrations, as well as each respective combination of elements in the block diagrams and flowchart illustrations, illustrates a function of the methods, apparatuses, and computer program products. Any and all such functions ("depicted functions") can be implemented by computer program instructions; by special-purpose, hardware-based computer systems; by combinations of special purpose hardware and computer instructions; by combinations of general purpose hardware and computer instructions; and so on—any and all of which may be generally referred to herein as a "circuit," "module," or "system."

While the foregoing drawings and description set forth functional aspects of the disclosed systems, no particular arrangement of software for implementing these functional aspects should be inferred from these descriptions unless explicitly stated or otherwise clear from the context.

Each element in flowchart illustrations may depict a step, or group of steps, of a computer-implemented method. Further, each step may contain one or more sub-steps. For the purpose of illustration, these steps (as well as any and all other steps identified and described above) are presented in order. It will be understood that an embodiment can contain an alternate order of the steps adapted to a particular application of a technique disclosed herein. All such variations and modifications are intended to fall within the scope of this disclosure. The depiction and description of steps in any particular order is not intended to exclude embodiments having the steps in a different order, unless required by a particular application, explicitly stated, or otherwise clear from the context.

Traditionally, a computer program consists of a finite sequence of computational instructions or program instructions. It will be appreciated that a programmable apparatus (i.e., computing device) can receive such a computer program and, by processing the computational instructions thereof, produce a further technical effect.

A programmable apparatus includes one or more microprocessors, microcontrollers, embedded microcontrollers, programmable digital signal processors, programmable devices, programmable gate arrays, programmable array logic, memory devices, application specific integrated circuits, or the like, which can be suitably employed or configured to process computer program instructions, execute computer logic, store computer data, and so on. Throughout this disclosure and elsewhere a computer can include any and all suitable combinations of at least one general purpose computer, special-purpose computer, programmable data processing apparatus, processor, processor architecture, and so on.

It will be understood that a computer can include a computer-readable storage medium and that this medium may be internal or external, removable and replaceable, or fixed. It will also be understood that a computer can include a Basic Input/Output System (BIOS), firmware, an operating system, a database, or the like that can include, interface with, or support the software and hardware described herein.

Embodiments of the system as described herein are not limited to applications involving conventional computer programs or programmable apparatuses that run them. It is contemplated, for example, that embodiments of the invention as claimed herein could include an optical computer, quantum computer, analog computer, or the like.

Regardless of the type of computer program or computer involved, a computer program can be loaded onto a computer to produce a particular machine that can perform any and all of the depicted functions. This particular machine provides a means for carrying out any and all of the depicted functions.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Computer program instructions can be stored in a computer-readable memory capable of directing a computer or other programmable data processing apparatus to function in a particular manner. The instructions stored in the computer-readable memory constitute an article of manufacture including computer-readable instructions for implementing any and all of the depicted functions.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

The elements depicted in flowchart illustrations and block diagrams throughout the figures imply logical boundaries between the elements. However, according to software or hardware engineering practices, the depicted elements and the functions thereof may be implemented as parts of a monolithic software structure, as standalone software modules, or as modules that employ external routines, code, services, and so forth, or any combination of these. All such implementations are within the scope of the present disclosure.

Unless explicitly stated or otherwise clear from the context, the verbs "execute" and "process" are used interchangeably to indicate execute, process, interpret, compile, assemble, link, load, any and all combinations of the foregoing, or the like. Therefore, embodiments that execute or process computer program instructions, computer-executable code, or the like can suitably act upon the instructions or code in any and all of the ways just described.

The functions and operations presented herein are not inherently related to any particular computer or other apparatus. Various general-purpose systems may also be used with programs in accordance with the teachings herein, or it may prove convenient to construct more specialized apparatus to perform the required method steps. The required structure for a variety of these systems will be apparent to those of skill in the art, along with equivalent variations. In addition, embodiments of the invention are not described with reference to any particular programming language. It is appreciated that a variety of programming languages may be used to implement the present teachings as described herein, and any references to specific languages are provided for disclosure of enablement and best mode of embodiments of the invention. Embodiments of the invention are well suited to a wide variety of computer network systems over numerous topologies. Within this field, the configuration and management of large networks include storage devices and computers that are communicatively coupled to dissimilar computers and storage devices over a network, such as the Internet.

While multiple embodiments are disclosed, still other embodiments of the present invention will become apparent to those skilled in the art from this detailed description. The invention is capable of myriad modifications in various obvious aspects, all without departing from the spirit and scope of the present invention. Accordingly, the drawings and descriptions are to be regarded as illustrative in nature and not restrictive.

A number of implementations have been described. Nevertheless, it will be understood that various modifications may be made. For example, advantageous results may be achieved if the steps of the disclosed techniques were performed in a different sequence, or if components of the disclosed systems were combined in a different manner, or if the components were supplemented with other components. Accordingly, other implementations are contemplated within the scope of the following claims.

What is claimed is:

1. A method to automatically remove a predetermined noise signal from a segmented audio stream containing a desired audio signal, comprising:

adapting an audio processing system to detect activity of the desired audio signal;

comparing at least two segments of the audio stream as a function of the predetermined noise signal and the desired audio signal, to determine a baseline degree of noise removal based on the comparison;

configuring an audio filter to remove the baseline degree of the predetermined noise signal; and, automatically improving the quality of the segmented audio stream based on filtering at least one segment of the audio stream with the audio filter, and adapting the audio filter degree of noise removal as a function of the activity of the desired audio signal and the baseline degree of noise removal.

2. The method of claim 1, wherein the desired audio signal further comprises a human voice.

3. The method of claim 1, wherein the method further comprises providing a user interface adapted to receive user input, and the noise signal is predetermined based on spectral analysis of a segment of the audio stream selected by a user.

4. The method of claim 1, wherein the predetermined noise signal is a wireless ring, hum, or tick.

5. The method of claim 1, wherein each segment of the audio stream represents at least ten milliseconds and not more than thirty milliseconds of real-time audio.

6. The method of claim 1, wherein adapting the audio filter degree of noise removal further comprises: determining a maximum degree of noise removal as a function of the energy level of the desired audio signal; configuring the degree of noise removal to the determined maximum upon a determination the desired audio signal is not active, and, restoring the degree of noise removal to the baseline degree of noise removal upon a determination the desired audio signal is active.

7. The method of claim 1, wherein adapting the audio filter degree of noise removal further comprises: determining a minimum degree of noise removal as a function of the energy level of the desired audio signal; configuring the degree of noise removal to the determined minimum upon a determination the desired audio signal is active, and, restoring the degree of noise removal to the baseline degree of noise removal upon a determination the desired audio signal is not active.

8. The method of claim 1, wherein the audio filter is configured as a function of spectral analysis of at least one of: the noise signal and the desired signal.

9. A method to automatically remove a predetermined noise signal from a segmented audio stream containing a desired audio signal, comprising:

adapting an audio processing system to determine at least one characteristic of the desired audio signal, determined as a function of at least one segment of the audio stream;

configuring an audio filter to remove the predetermined noise signal;

wherein configuring the audio filter further comprises determining the fundamental frequency of background noise measured when the desired audio signal is not active, and configuring the audio filter to remove one or more harmonic of the background noise; and, automatically improving the quality of the segmented audio stream based on filtering at least one segment of the audio stream with the audio filter, and adapting the audio filter degree of noise removal as a function of the at least one characteristic of the desired audio signal.

10. The method of claim 9, wherein the at least one characteristic of the desired audio signal further comprises activity detection.

11. The method of claim 9, wherein the at least one characteristic of the desired audio signal further comprises energy level.

12. The method of claim 9, wherein the desired audio signal further comprises a human voice.

13. The method of claim 9, wherein filtering at least one segment of the audio stream with the audio filter further comprises removing the at least one segment.

14. The method of claim 9, wherein filtering at least one segment of the audio stream with the audio filter further comprises configuring the audio filter to remove at least one harmonic residual from a previous filtering step.

15. The method of claim 9, wherein the predetermined noise signal further comprises a wireless signal.

16. A system to automatically remove a predetermined noise from a segmented audio stream containing a desired audio signal, comprising:

an audio processing system adapted to determine at least one characteristic of a received segmented audio stream and emit segments of the audio stream comprising filtered audio;

a processor, operably coupled to the audio processing system; and, a memory that is not a transitory propagating signal, the memory connected to the processor and encoding computer readable instructions, including processor executable program instructions, the computer readable instructions accessible to the processor, wherein the processor executable program instructions, when executed by the processor, cause the processor to perform operations comprising:

receiving, from the audio processing system, a series of audio stream segments;

configuring the audio processing system to detect activity of the desired audio signal;

comparing at least two segments of the audio stream as a function of the predetermined noise signal and the desired audio signal, to determine a baseline degree of noise removal based on the comparison;

configuring an audio filter to remove the baseline degree of the predetermined noise signal;

configuring the audio processing system to determine at least one characteristic of the desired audio signal, determined as a function of at least one segment of the audio stream; and, automatically improving the quality of the segmented audio stream based on filtering at least one segment of the audio stream in the audio processing system with the audio filter, and adapting the audio filter degree of noise removal as a function of the at least one characteristic of the desired audio signal.

17. The system of claim 16, wherein the at least one characteristic of the received segmented audio stream is determined based on frequency domain analysis.

18. The system of claim 16, wherein the audio filter further comprises reverse gate means operable to remove less noise when the gate is open, and operable to remove more noise when the gate is closed; and, adapting the audio filter degree of noise removal further comprises opening the reverse gate when the desired audio signal is active, and closing the reverse gate when the desired audio signal is not active.

19. The system of claim 16, wherein the desired audio signal further comprises a human voice.

* * * * *